United States Patent [19]

Donato et al.

[11] Patent Number: 5,351,708

[45] Date of Patent: Oct. 4, 1994

[54] AUTOMATIC FLUID SEALING MECHANISM FOR A CONDUIT WITH A FRANGIBLE CONNECTOR

[75] Inventors: Joseph T. Donato; John H. Calvin, both of Newbury Park, Calif.

[73] Assignee: Symetrics, Newbury Park, Calif.

[21] Appl. No.: 165,956

[22] Filed: Dec. 13, 1993

[51] Int. Cl.⁵ .............................................. F16K 17/40
[52] U.S. Cl. ................................ 137/68.1; 137/614.02
[58] Field of Search .................. 137/68.1, 614.02, 614, 137/614.01, 797, 637.05; 251/305, 306, 314

[56] References Cited

U.S. PATENT DOCUMENTS

| | | | |
|---|---|---|---|
| 3,575,379 | 4/1971 | Hoos | 251/314 |
| 4,625,746 | 12/1986 | Calvin et al. | 137/68.1 |
| 4,828,183 | 5/1989 | Fink, Jr. | 137/68.1 X |
| 4,896,688 | 1/1990 | Richards et al. | 137/68.1 |
| 5,186,202 | 2/1993 | Meisenheimer, Jr. | 137/68.1 |
| 5,305,776 | 4/1994 | Romano | 137/68.1 |

*Primary Examiner*—Martin P. Schwadron
*Assistant Examiner*—Kevin L. Lee

[57] ABSTRACT

A sealing mechanism for a pair of conduits held together by means of one or more frangible connectors. Each conduit has a pivoted disc-shaped butterfly valve which is spring biased to a closed position. The butterfly valves are normally held open by a flat pivoted spacer, and are released when the frangible connectors are broken and the valves move away from the spacer. A mechanism for positively closing and latching the butterfly valves in a closed position is included in the valve assembly. The valves and the spacer together form a thin flat co-planar assembly when the valves are in their open position so as to minimize turbulence in the fluid passing through the conduits thereby reducing resistance to fluid flow to an absolute minimum.

3 Claims, 3 Drawing Sheets

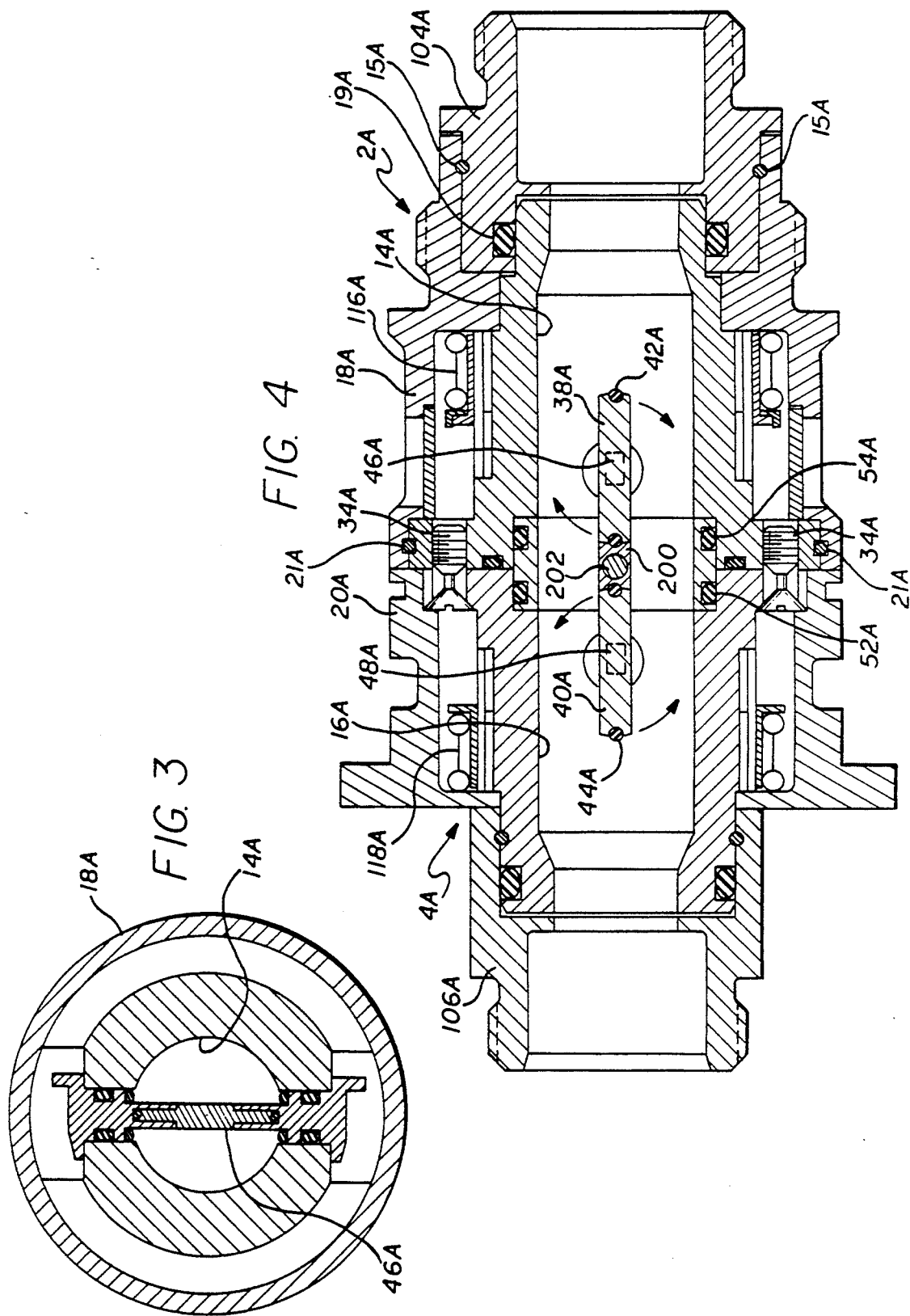

AUTOMATIC FLUID SEALING MECHANISM FOR A CONDUIT WITH A FRANGIBLE CONNECTOR

BACKGROUND OF THE INVENTION

This invention relates to conduit systems of the type described in U.S. Pat. No. 4,625,746, which have a frangible connector, and which also have two automatic sealing mechanisms for blocking the flow of fluid out of the ruptured ends of the conduit should the connector become broken.

As described in U.S. Pat. No. 4,625,746, it is often important to prevent leakage of flammable or noxious fluids from a conduit after the conduit has been ruptured. For example, fuel spillage from an aircraft fuel line after a crash can result in an explosion or severe fire. In order to avoid such spillage, frangible connectors have been developed with the object of controlling the location in the fuel line at which a break will take place, and by providing a valve mechanism which acts automatically to seal off the spillage of fuel out of the fuel line at the ruptured ends of the fuel line adjacent to the frangible connector as quickly as possible.

In the prior art assemblies, to accomplish the objectives described in the preceding paragraph, the fuel line or other conduit is typically divided into two sections which are joined together by one or more frangible connectors. The frangible connector has a relatively weak linkage holding it together so that under the stress of a crash, or other accident, a break will occur at the connector before anywhere else in the conduit. A valve mechanism is provided in the conduit sections on either or each side of the frangible connector which acts automatically to stop the spillage of fluid when the connector is broken. It is important, of course, that the valve mechanism be fast operating, reliable and, especially for aerospace applications, be as small and as light-weight as possible.

One type of valve mechanism for a frangible connector is described in U.S. Pat. No. 4,625,746 referred to above. In the mechanism of that patent, two butterfly valves are mounted in respective fluid-carrying conduit sections in the vicinity of a frangible connector which connects the two conduit sections together in a coaxially aligned relationship. Each valve in the mechanism described in the patent comprises a sealing disc which is pivotally mounted in its conduit section, and the mechanism includes spring means in each of the conduit sections which biases the corresponding disc about its rotational axis toward a closed position sealing the corresponding section. In the mechanism described in the patent, the two discs are positioned so that they pivot on mutually intersecting arcs with each disc normally abutting against the other in an open position, thereby preventing each other from closing. When the frangible connector is broken, however, and the two conduit sections become separated, and the discs are released, and they are pivoted by their respective springs to closed positions and latched to seal off the ruptured ends of the corresponding conduit sections.

The sealing mechanism of the present invention is generally similar to the mechanism described in U.S. Pat. No. 4,625,746. Specifically, the mechanism of the present invention also includes a pair of conduit sections which are held together in coaxial relationship by frangible connectors, and which further includes a butterfly valve pivotally mounted in each of the conduit sections, with the two valves being spring biased to a closed position and latched when the conduit sections become separated.

However, in the mechanism of the present invention the two butterfly valves do not overlap during normal flow of fluid through the conduit, but are held in their open position by a separate pivotally mounted flat spacer. The spacer and the two butterfly valves have a uniplanar relationship, and form a flat thin assembly during normal flow of fluid through the conduit. The resulting elimination of the overlapping relationship of the two butterfly valves as in U.S. Pat. No. 4,652,746 minimizes turbulence in the fluid flowing through the conduit, and accordingly reduces pressure drop/flow rate in the mechanism of the invention during normal operation.

Accordingly, an objective of the present invention is to provide an improved frangible sealing mechanism which includes a pair of conduit sections, each containing a spring biased butterfly valve, and which exhibits improved pressure drop/flow rate performance as compared with the prior art mechanisms of the same general type.

Another objective of the invention is to provide such an improved frangible valve sealing mechanism in which the distance between the pivotal axes of the two butterfly valves in the two conduit sections may be increased as compared with the maximum possible distance in the prior art mechanisms. This ability to increase the distance between the valve's pivotal axes is an advantage when dual frangible fuse planes must be incorporated into the design to comply with specification requirements, as is often the case.

One major area of concern in breakaway valve operation is the sticking potential of the seal on the shutoff valve. After several years of exposure to aircraft fuels, many seal compounds swell and cause high friction loads on the shutoff valves as they attempt to rotate to their closed positions after the conduit sections become separated. Because the closure of the valves is caused solely by preloaded springs, high friction loads can prevent the valves from closing, resulting in an open flow passage from the fuel system at a time when it is essential that the fuel be cut off.

The mechanism of the invention, in one of its embodiments, uses a pressure energized seal which inflates and improves sealing of the valve after it has been closed. This permits interference and friction during initial closure to be reduced with improved sealing to occur when a pressure differential across the valve is encountered. The pressure energized seal requires an upstream versus downstream pressure differential to inflate and seal. Such pressure differential does not occur until the valve is closed after separation of the two conduit sections because under normal fluid flow through the conduit both sides of the seal are equally pressurized when the valve is open. Accordingly, the pressure energized seal provides reduced friction during closure because (a) it is not energized until the valve is closed, and (b) it is made of non-elastomer material which does not swell when immersed in aircraft fuel. Pressure energized seals such as those described, for example, in U.S. Pat. Nos. 4,836,499; 4,176,675; 4,254,936; and 4,540,457, may be adapted for use in the mechanism of the invention.

The foregoing and other objects and features of the invention will become apparent to those skilled in the art from the following detailed description, taken together with the accompanying drawings.

BRIEF DESCRIPTION OF THE DRAWINGS

FIG. 3 is a cross-section taken essentially along the line 3—3 of FIG. 2; and

FIG. 4 is a sectional view similar to the view of FIG. 3, but with the mechanism being turned ninety degrees on its longitudinal axis.

DETAILED DESCRIPTION OF THE ILLUSTRATED EMBODIMENT

Figure 1:
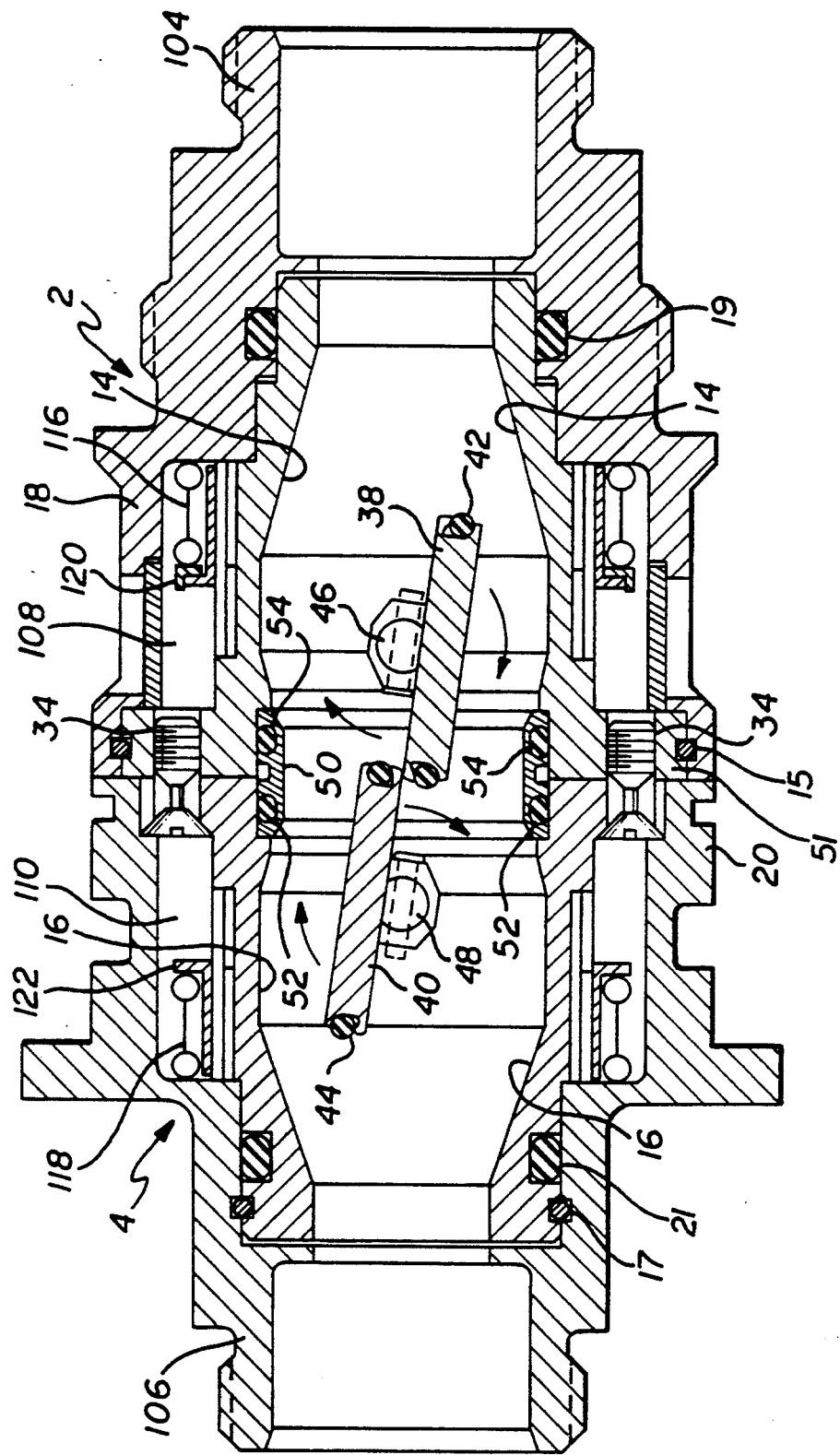
FIG. 1 is a side sectional view of a prior art frangible connector with a fluid sealing mechanism constructed in accordance with the teachings of U.S. Pat. No. 4,625,746.

Referring first to FIG. 1, a prior art frangible connector mechanism constructed in accordance with the teachings of U.S. Pat. No. 4,625,746 is shown, the device being similar to the mechanism described in the patent in conjunction with FIGS. 9, 11, 12.

Figure 2:
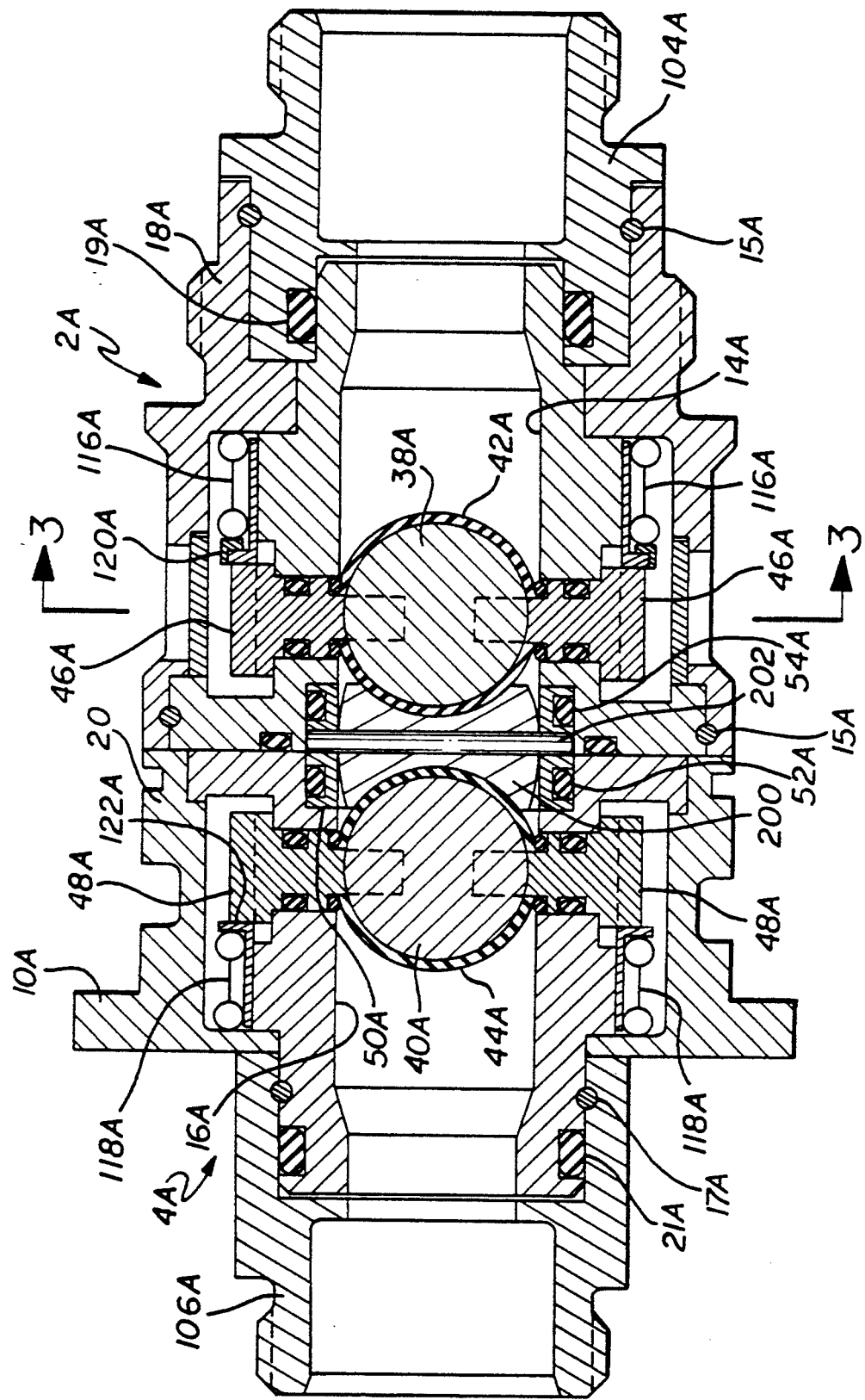
FIG. 2 is a side sectional view, like FIG. 1, but modified to show a fluid sealing mechanism constructed in accordance with the present invention.

The prior art mechanism of FIGS. 1 & 2 includes a pair of conduits 2 and 4 which respectively have outer housings 18, 20 that abut each other when the conduits are aligned in coaxial relationship. Threaded fittings 104 and 106 are provided at opposite ends of conduits 2 and 4 for connection to fuel lines and the like. Conduits 2, 4 also comprise inner housings 14, 16 held in the outer housings 18, 20, by retainer rings 15, 17, and sealed to the outer housings by O-rings 19, 21.

The conduit sections are formed from any suitable metal or plastic material having the desired strength characteristics and chemically inert to the fuel or other fluid passed through the assembly. The two conduits 2 and 4 are held together by a plurality of frangible connectors 34, two of which are shown is FIG. 1.

Mounted inside each conduit the vicinity of the frangible connectors is a butterfly valve which is held open when the connector is intact, and which pivots to seal off its respective conduit when the connector is broken. The two butterfly valves designated 38, 40 comprise circular aluminum alloy discs respectively pivotally mounted in the inner housing 14, 16. Circular seals 42, 44 are seated into grooves which extend around the periphery of butterfly valves 38, 40, respectively. When the butterfly valves 38 and 40 are turned from the open position of FIG. 1 to a closed position, the seals establish circumferential surface contact with the inner walls of housing 14, 16 to seal off the conduits. If desired seals 42, 44 may be mounted in the inner walls of inner housing 14, 16, instead of the valves 38, 40.

Butterfly valves 38, 40 are respectively mounted on pivot support members comprising shafts 46, 48, respectively. Each shaft extends substantially along a diameter of its associated conduit perpendicular to the direction of fluid flow, and with its axis laterally offset from the plane of the seal encircling the butterfly valve. With such an arrangement, each butterfly valve accordingly is rotated about its associated pivot shaft, rather than its internal diameter.

Butterfly valves 38, 40 are positioned within their respective conduits 2 and 4 so as to pivot along mutually intersecting arcs when the two conduits are brought together. Each butterfly valve is spring biased to pivot to a latched closed position locking the outward flow of fluid through its associated conduit.

The butterfly valves 38, 40 are shown in an open position in FIG. 1, with the direction of spring biased rotation indicated by arrows. In the open position, each butterfly valve abuts against the other under the influence of its respective spring bias, so that neither butterfly valve can be pivoted closed. The butterfly valves lie in a plane generally parallel to the conduit axis, and thereby present only a relatively small resistance to fluid flow. However, some turbulence does occur, and an objective of the present invention is to reduce any resistance to the fluid during normal flow through the conduit to an absolute minimum, and accordingly to reduce any turbulence in the fluid flow, likewise, to an absolute minimum.

The butterfly valves in the mechanism of FIG. 1 are maintained in a state of mutual tension until the frangible connectors 34 are broken and the two conduits 2 and 4 become separated. When that occurs, the butterfly valves pivot approximately ninety degrees from the closed position shown in FIG. 1, to a position in which each butterfly valve extends across the inner diameter of its corresponding conduit section.

A sleeve 50 is positioned inside the conduits 2 and 4 adjacent to the circumferential interface between the two conduits, and extends into each conduit on either side of the interface. Seals 52, 54 are positioned in grooves formed in the sleeve 50 on each side of the interface, to form a fluid seal. Sleeve 50 provides additional resistance to bending loads when required, and also acts to delay spillage of fuel from the conduits during the times when the butterfly valves are closing after the frangible connector has been broken.

As fully described in U.S. Pat. No. 4,625,746, the principal advantage of the embodiment shown in FIGS. 11 and 12 of the patent stems from the spring bias mechanism which is used to close the valve. For this purpose, single coil springs 116, 118 are lodged respectively within housings 108, 110 in the two conduits 2 and 4. Bearing members 120, 122 at the forward end of each coil spring, that is at the end facing the frangible connectors, are urged against corresponding bearing reception members on opposite ends of the pivot shafts 46, 48. The coil springs are compressed to a flexed state between the rear housing wall and the bearing reception members on the shafts, with the intersection of butterfly valves 38, 40 (shown in FIG. 1) preventing the valves from closing when the conduits are joined. However, when the fracture occurs, the conduits are separated from one another, the coil springs 116 and 118 expand from their initially compressed positions to close the valves to their latched positions. This produces a substantial closing spring force on the valve.

The mechanism of the present invention in one of its embodiments is shown in FIGS. 2, 3 and 4. The mechanism of the invention is similar in some respects to the prior art mechanism of FIG. 1, and similar elements have been designated by the same numbers with the addition of the letter "A."

In the embodiments of FIGS. 2, 3 and 4, the butterfly valves 38A and 40A, instead of overlapping one another when in their normal position, as was the case in the prior art mechanism of FIG. 1, are aligned with one another, as best shown in FIG. 4. This serves to minimize the resistance to the fluid flow through the conduit, and also to minimize turbulence of the fluid. In accordance with the invention, the butterfly valves 38a and 40a are separated by a co-planar flat spacer member 200 which is pivotally mounted on a pin 202 which is received in sleeve 50A. Member 200 has arcuate edges, as best shown in FIG. 2, which receive the corresponding edges of the butterfly valves 38A and 40A.

So long as the mechanism is operating under normal conditions, the flat co-planar spacer 200 engages the edges of the butterfly valves 38A and 40A and prevents the butterfly valves from rotating to their closed position. Accordingly, the butterfly valves 38A and 40A are held in the position shown in FIG. 4, for unobstructed fluid flow through the assembly. However, should the frangible connectors 34a be broken, and the two conduit sections become separated, the spacer 200 is no longer held in the position of FIGS. 2 and 3 by the two butterfly valves 38A and 40A, but is free to rotate about the axis of pin 202 to release the butterfly valves. When that occurs, the butterfly valves pivot approximately 90 degrees from the position shown in FIGS. 2 and 3 to a latched position in which each butterfly valve extends across the inner diameter of its corresponding conduit section. This action is under the bias force of springs 116A and 118A. When the butterfly valves are closed, they are latched to the closed position by latches, as described in U.S. Pat. No. 4,625,746.

As stated above, the peripheral seals 42a, 44a may be of the pressurized energized type, as described above, which inflate and improve sealing of the valves after they have been closed. As stated above, such a seal causes interference and friction during initial closure to be reduced and improved sealing to occur when the pressure differential across the valve is encountered.

The invention provides, therefore, an improved frangible sealing mechanism in which the butterfly valves are separated by the flat co-planar pivoted spacer member 200 and are held by the spacer in their open position. As shown in FIG. 2, and as described above, the spacer 200 and two butterfly valves 38A and 40A have a co-planar relationship when the valves are in their open position, to form a flat thin assembly during normal flow of fluid through the conduit. The resulting elimination of the overlapping relationship of the two butterfly valves minimizes turbulence in the fluid flowing through the conduit, as compared with the prior art mechanism of FIG. 1, and accordingly reduces pressure-drop/flow rate in the mechanism during normal operation.

Moreover, the use of the pivoted spacer 200 permits the distance between the two butterfly valves 38A and 40A to be increased as compared with the maximum possible distance in the prior mechanism of FIG. 1. This ability to increase the distance between the pivotal axes of the valves is an advantage when dual frangible fuel planes must be incorporated into the mechanism to comply with specification requirements, as is often the case.

It will be appreciated that while a particular embodiment of the invention has been shown and described, modifications may be made. It is intended in the claims to cover all modifications which come within the true spirit and scope of the invention.

I claim:

1. A sealing mechanism for a pair of conduits held together in axially aligned coaxial relationship by frangible connecting means, said mechanism comprising: first and second disc-shaped butterfly valves pivotally mounted in respective ones of said conduits in the vicinity of said frangible connecting means; spring means coupled to each of said butterfly valves to bias each of the valves from an open position in which it extends parallel to the longitudinal axis of the corresponding conduit to a closed position in which it turns ninety degrees and extends across the corresponding conduit in sealing relationship therewith; said disc-shaped butterfly valves being axially spaced from another when in their open position, and a spacer member pivotally mounted in one of said conduits and interposed between said butterfly valves in position to engage the respective peripheral edges of said valves and hold the valves in an open position so long as the conduits are held together by said frangible connecting means, in which said spacer member has opposite arcuate edges configured to mate with the adjacent peripheral edges of the disc-shaped butterfly valves when the valves are in their open position, and in which said butterfly valves and said spacer member are flat and have a co-planar relationship when the valves are in their open position so as to reduce the pressure-drop/flow rate of fluid through the conduits and thereby minimize turbulence.

2. The mechanism defined in claim 1, in which said butterfly valves each has a sealing ring extending around its periphery.

3. The mechanism defined in claim 2, in which said sealing ring is pressure energized.

* * * * *